Feb. 19, 1952   C. HERZOG   2,586,651
MATERIAL EJECTING AND FEEDING APPARATUS
Filed April 12, 1950   3 Sheets-Sheet 1

INVENTOR
C. HERZOG
BY W.C. Parnell
ATTORNEY

Feb. 19, 1952 C. HERZOG 2,586,651
MATERIAL EJECTING AND FEEDING APPARATUS
Filed April 12, 1950 3 Sheets-Sheet 2

INVENTOR
C. HERZOG
BY W.C. Parnell
ATTORNEY

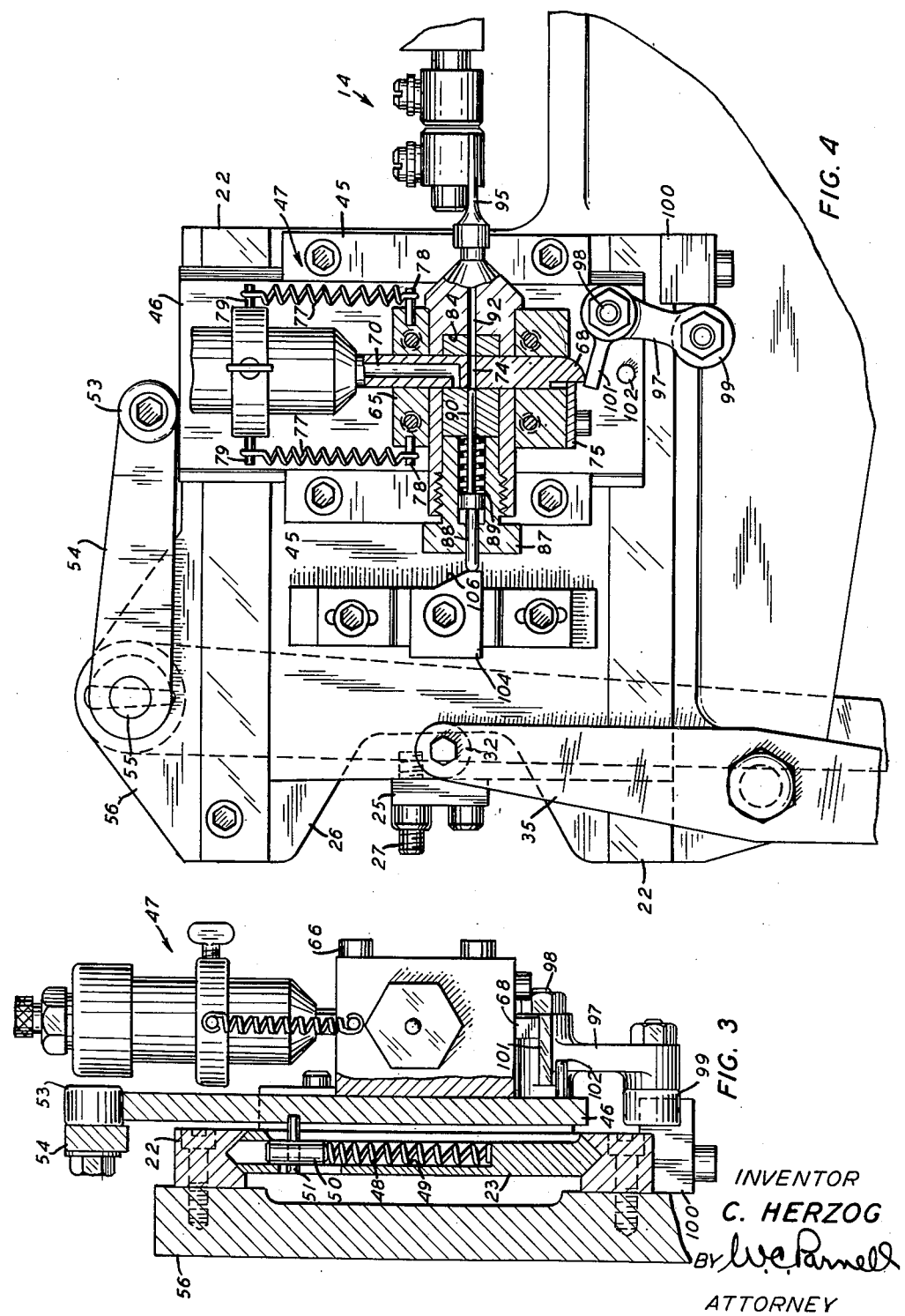

Patented Feb. 19, 1952

2,586,651

UNITED STATES PATENT OFFICE 2,586,651

MATERIAL EJECTING AND FEEDING APPARATUS

Carl Herzog, Belleville, N. J., assignor to Western Electric Company, Incorporated, New York, N. Y., a corporation of New York Application April 12, 1950, Serial No. 155,519

4 Claims. (Cl. 118—323)

This invention relates to a material ejecting and feeding apparatus and more particularly to apparatus for ejecting measured quantities of thermistor material and feeding them intermittently to parallel wires in the processes of forming thermistor units.

Thermistor units of this type have been made by hand depending upon the skill of the individual to place the desired amounts of thermistor material at accurate locations on the wires. With this method, it was difficult to produce uniform units.

An object of the invention is to provide an apparatus which is simple in structure and efficient in operation for ejecting like quantities of material intermittently and feeding these quantities of material to an article.

With this and other objects in view, the invention comprises a material ejecting and feeding apparatus including a hollow element movable in a rectilinear path relative to an article and associated with a feeding mechanism operable during given intervals of time in which the element is moved to eject known quantities of material from the element and feed the material to the article.

More specifically, the invention includes a carriage reciprocable relative to the path of parallel wires and a feeding unit supported by the carriage to be moved toward and away from the wires. The feeding unit includes a container for the material, a needle-like hollow element through which the quantities of the material are forced, and a mechanism for removing measured quantities of the material from the container and forcing these quantities of material through the needle-like element. The unit is mounted for vertical movement on the carriage and is reciprocated at given time intervals with respect to the reciprocable movements of the carriage whereby the combined movements will cause the exhaust end of the hollow element to travel in a rectangular path, first moving toward the wires to position a quantity of the material immediately above the wires, then move downwardly to force the material on to and about the wires after which the element in moving with its unit is backed away from the wires and moved vertically to its starting position.

Other objects and advantages will be apparent from the following detailed description when considered in conjunction with the accompanying drawings, wherein:

Fig. 3 is a fragmentary sectional view of the apparatus, this view being taken near the left side of the feeding mechanism;

Fig. 4 is a side elevational view of the apparatus shown at the end of its first movement, portions of the feeding mechanism being shown in section;

Fig. 5 is a schematic illustration of the path of the leading end of the hollow element, its present position being at the end of its forward stroke just before a quantity of material is fed to the wires; and Fig. 6 is a cross-sectional view of the wires after the material has been fed thereto.

Figure 1:
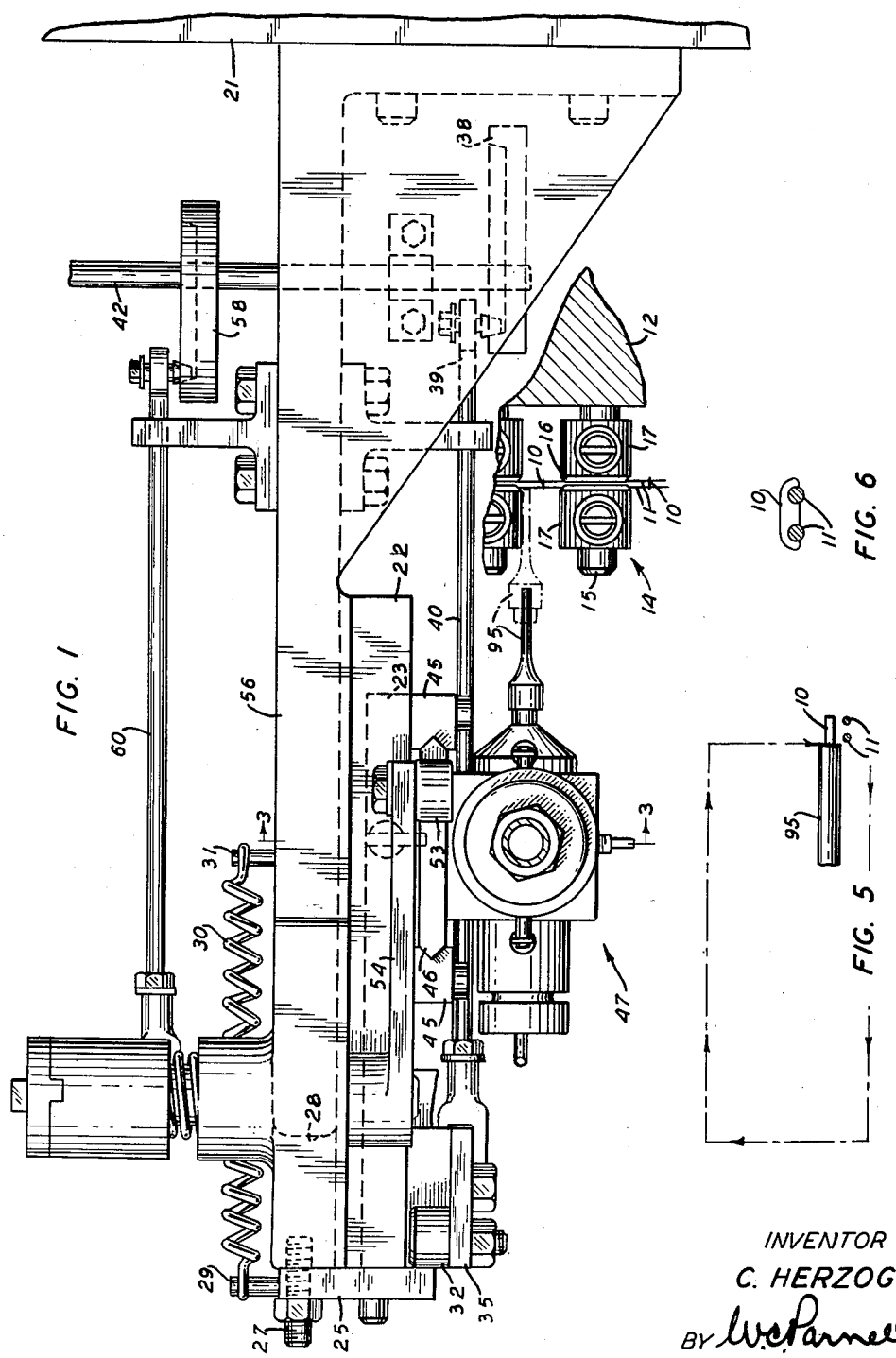
Fig. 1 is a top plan view of the apparatus.

Referring now to the drawings, the apparatus is a completely automatic structure for feeding like quantities of material 10 to two spaced wires 11 as the wires are advanced longitudinally or during their intervals of rest between longitudinal advancements. Any suitable means may be employed for supporting the wires 11, and moving them longitudinally in a given path. In the present illustration, this means includes a wheel-like member 12 rotated at a given speed continuously or intermittently, if desired, and supporting, adjacent its periphery, a plurality of equally spaced clamping units 14 including supporting pins 15, spacers 16 and resiliently urged clamping blocks 17 to force the wires 11 into gripping engagement with their respective sides of the spacing element 16.

The apparatus includes a frame 20 mounted in the present instance in a horizontal position on a suitable support 21 and including horizontal guideways 22 mounted at parallel spaced positions on the frame to support a carriage 23 for sliding movement toward and away from the path of the wires 11. A plate or abutting member 25 is rigidly mounted on one end of the carriage 23 and is movable in a cutaway portion 26 of the frame 20. The member 25 has three distinct functions: one, in supporting an adjustable screw 27 to engage the inner portion 28 of the cutaway portion 26 to limit the movement of the carriage to the right; second, to support a connecting pin 29 for connection with one end of a spring 30 which supplies the force to move the carriage to the right, the other end of the spring being connected to a pin 31 mounted on the frame 20, and third, to engage a roller 32 of an actuating mechanism for the carriage.

The roller 32 is mounted on the upper end of a rocking lever 35 which is pivotally supported intermediate its ends at 36, the pivot 36 being supported by the main frame 20. In the present embodiment of the invention, the lever 35 is operatively connected to a cam 38 at 39 through a pull rod 40 which is connected at 41 to the lower end of the lever. The cam 38 is mounted on a cam shaft 42 which is driven by a suitable power means (not shown).

The carriage 23 has parallel vertical guides 45 mounted thereon to support a slide 46 for a unit indicated generally at 47. The slide 46 is normally urged upwardly by a spring 48, housed in a vertical aperture 49 in the carriage 23 as shown in Fig. 3. A plunger 50 carrying a pin 51 completes the connection between the spring 48 and the slide 46 whereby the force of the spring will normally urge the slide into engagement with a roller 53. The roller 53 is supported by the adjacent end of a lever 54, the opposite end of the lever being fixed to a shaft 55 journalled in a suitable bearing in a bracket portion 56 of the main frame 20. In the present embodiment of the invention, the shaft is rocked through the actuation of a cam 58 mounted on the shaft 42 to reciprocate a connecting rod 60 and a rocking lever 61 connected at its lower end 62 to the connecting rod 60 and at its upper end to the shaft 55.

The unit 47 includes a supporting member 65 fixedly mounted on the vertical slide 46 by screws 66 and provided with a laterally extending aperture to receive a housing 67 and a vertical aperture to receive a valve element 68. The valve 68 has a receptacle 69 for the material 10 mounted on the upper end thereof and is provided with a passageway 70 opening into the receptacle whereby a supply of the material, disposed in the receptacle through an inlet 71, may be fed downwardly through the passageway to its outlet 72. The valve 68 is also provided with a laterally extending passageway 74 positioned beneath the outlet 72. The valve 68 is slidable in its aperture in the supporting member 65 and is normally urged downwardly by springs 77 into the position shown in Fig. 2 against its stop 75 which is fixedly mounted on the under surface of the supporting member 66. The springs 77 have their lower ends connected to pins 78 carried by the supporting member 65, while their upper ends are connected to pins 79 extending laterally from a collar 80 disposed concentric with the receptacle 69 and secured at a selected position longitudinally of the receptacle by a set screw 81 to vary the force embodied in the spring 77 to move the valve 68 downwardly.

The housing 67 has an opening 84 to receive an insert 85 provided with a longitudinal passageway 86 and held in place by a plug 87 threadedly mounted in the opening 84. The plug 84 is centrally apertured to receive a plunger 88 normally urged to the left by a spring 89 and having a reduced portion 90 movably disposed in the passageway 86. A passageway 92 in the housing 67 is in alignment with the passageway 86 and extends through an outer reduced end 93 upon which a hollow needle-like feeding element 95 is mounted.

A lever 97 pivotally supported at 98 on the vertical slide 46 carries a roller 99 at its lower end to engage a cam-like projection 100 on the main frame 20 or the guide 22 to be engaged by the roller as the carriage 23 nears the end of its movement to the right (Fig. 2) whereby the lever will be rocked about its pivot. An arm 101 of the lever 97 is positioned to engage the valve 68 and is limited in its clockwise movement by a stop pin 102.

The outer end of the plunger 88, that is, that portion which extends outwardly to the left of the plug 84 is positioned to travel relative to an adjustable cam 104 mounted on a bracket 105 and having a tapered cam surface 106.

Figure 2:
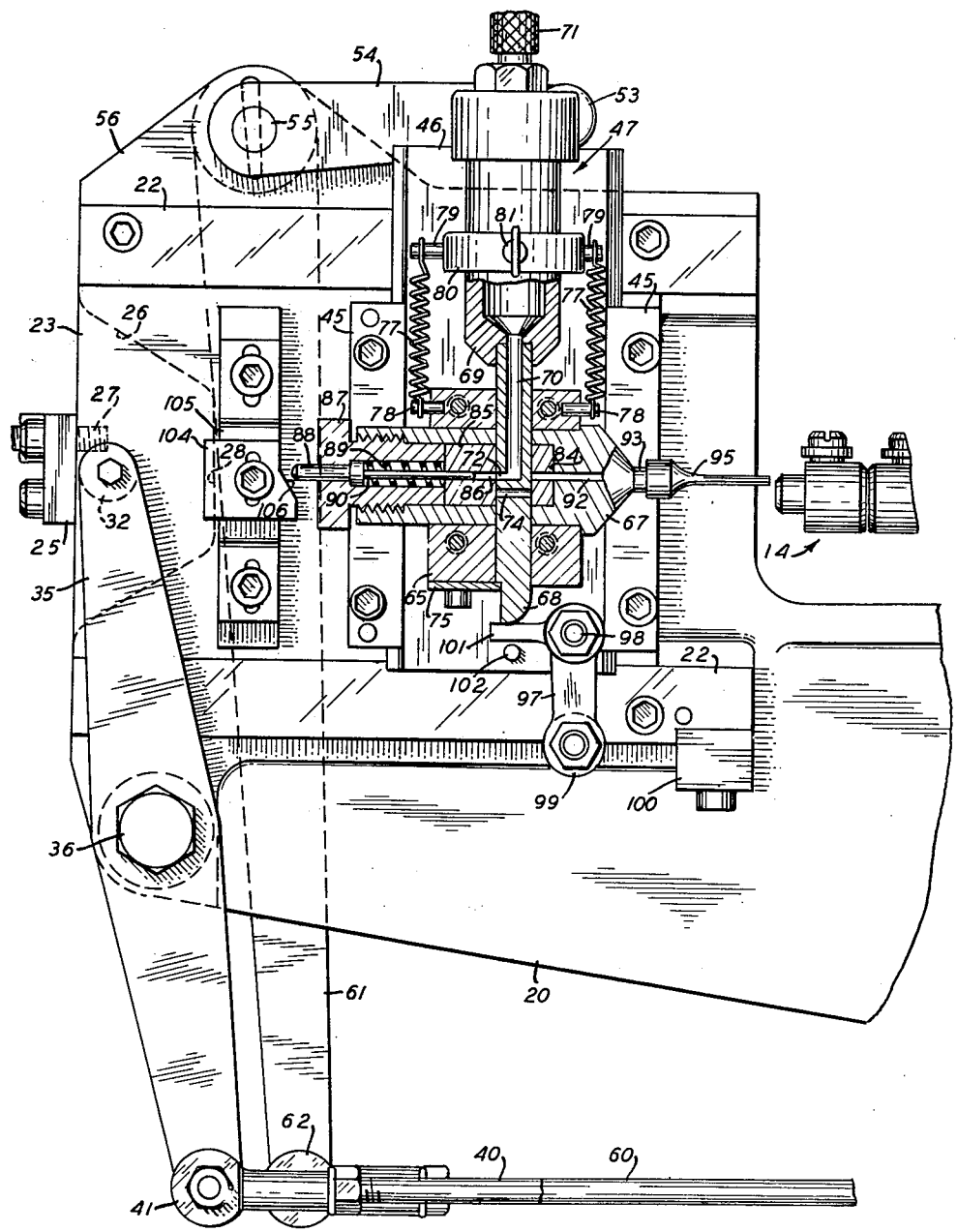
Fig. 2 is a side elevational view of the apparatus in its starting position, portions of the feeding mechanism being shown in section.

Considering now the operation of the apparatus, let it be assumed that the wheel 12 travels in timed relation with the shaft 42, the cams 38 and 58 of which control the operation of the apparatus, whereby measured quantities of the material 10 are ejected intermittently and fed to the wires 11. The apparatus as shown in Fig. 2 is in its starting position with the carriage 23 at its extreme left and the unit 47 on the vertical slide 46 at its extreme upper position. The feeding or needle-like element 95 is moved in the rectangular path illustrated by the arrows in Fig. 5, first to a position where the ejected quantity of the material will be located above the wires, after which the element 95 will be moved downwardly to feed this portion of the material 10 to the wires, the carriage 23 then being moved to the left, after which the vertical slide 46 is moved upwardly completing the cycle of operation of the apparatus. As indicated in Fig. 5, there are four main motions, namely the forward motion of the carriage 23, the downward motion of the slide 46, the rearward motion of the carriage 23 and the upward motion of the slide 46, these motions being imparted to the carriage and the slide through their operating means during rotation of the cam shaft 42 with the cams 38 and 58. In reality the carriage 23 is moved forwardly by its spring 30, but its movement is directly under the control of its cam 38, the connecting rod 40, the lever 35, the roller 32 and the plate 25. The return movement of the carriage is directly under the control of the cam 38 and its associated mechanism against the force of the spring 39. It will be apparent by viewing Figs. 2 and 4 that during these movements of the carriage 23, the roller 53 of the lever 54 rides upon the upper surface of the slide 46. Although the slide 46 is moved upwardly by its spring 48 (Fig. 3) it is obvious under the control of its cam 58 and the operating mechanism interposed between the cam 58 and the roller 53 whereby the downward and upward motions of the slide to complete the rectilinear path through which the end of the feeding element 95 travels.

As previously described, during the forward motion of the carriage the roller 99, of the lever 97 pivotally supported by the slide 46, engages the stop 100 whereby continued forward movement of the carriage will actuate the lever from the position shown in Fig. 2 to the position shown in Fig. 4 to move the valve 68 upwardly to align the aperture 74 with the passageway 92 whereby forward movement of the portion 90 of the plunger 88 will force a measured amount of the material from the element 95 so that during the downward movement of the element, this measured amount of material will be laid upon the wires 11 as shown in Fig. 6.

It should be understood that prior to the operation of the apparatus, the aperture or passageway 74, together with the passageway 92 in the housing 67 and the hollow portion or passageway in the element 95 are completely filled with the material 10. The measured quantities of the material received from the receptacle 69 in the passageway 86 between the plunger portion 90 and the valve 68 will be added to the material in these passageways thereby ejecting the same amount of material from the feeding element 95. For example, during the return movement of the apparatus, the carriage 23 is moved to the left to its position shown in Fig. 2 freeing the lever 97 allowing the spring 77 to function to force the valve 68 with its receptacle 69 downwardly limited by the stop 75 to align the outlet 72 of the passageway 70 with the passageway 86 and the plunger 90. The next step in the operating cycle of the apparatus is the vertical movement of the slide 46 to its normal position under the control of its cam 58. The cam 104 whose surface 105 forces the plunger 88 to the right during the downward movement of the slide 46, forcing the measured quantity of material forwardly to effect ejection of a similar quantity of material from the element 96 on to the wires, will free the plunger so that its spring 89 may move the plunger rearwardly causing the portion 90 to act as a piston creating a suction in its passageway 86 to draw material aided by the force of gravity from the receptacle 69 through the passageway 70 into the passageway 86. The feeding mechanism is thereby loaded with a measured quantity of material to be fed to articles such as wires although this exact measured quantity of material will only be added to the supply already in the feeding line, but the addition of this measured quantity of material to the supply in the feeding line will result in the ejection of an identical quantity of the material from the element 95 to be fed to the wires during the downward motion of the slide and the feeding.

The material ejecting and feeding apparatus of the copending application of R. F. Brewer and C. W. Henderson, Serial No. 155,504, filed April 12, 1950, is for accomplishing the same result as the apparatus of this application. The claims of this application are to cover the differences in structure between the apparatus of this application and that of the copending application. Some of the main differences include the carriage and slide for the unit 47 and the means whereby their straight line movements may be translated into a rectilinear motion to eject and lay the material on the strands of wires. Also the operating means 101 and 104 for the unit 47 are features of differences to be claimed. The broader more general claims are to be included in the copending application.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus operable through repeated cycles to eject given quantities of a material intermittently and feed them to spaced positions on a longitudinally advanced article, the apparatus comprising a hollow feeding element, a receptacle for the material, a carriage reciprocable in a given straight path toward and away from the article, a support for the element mounted on the carriage for reciprocable movement in the given straight path with the carriage and for reciprocable movement in a transverse straight path, means to force quantities of the material from the receptacle through the feeding element and eject them from the element, and means operable in timed relation with each other to reciprocate the carriage and the support whereby the feeding element will be moved through their combined straight path means in a rectilinear path relative to the article to move the quantities of material toward the article and to force the quantities of material onto the article.

2. An apparatus operable through repeated cycles to eject given quantities of a material intermittently and feed them to spaced positions on a longitudinally advanced strand, the apparatus comprising a hollow feeding element, a receptacle for the material, a support for the element, means to force quantities of the material from the receptacle through the feeding element and eject them from the element, and a means operable to move the support with the feeding element in a rectilinear path relative to the strand to cause the element to move the quantities of material in straight line motions toward the strand and in transverse straight line motions lay the quantities of material on spaced portions of the strand.

3. An apparatus operable through repeated cycles to eject given quantities of a material intermittently and feed them to spaced positions on a longitudinally advanced article, the apparatus comprising a unit including a hollow feeding element, a receptacle for the material, a measuring chamber, a valve actuable to alternately connect the chamber to the receptacle and the element, a plunger normally urged in one direction in the chamber to draw measured quantities of the material from the receptacle into the chamber and movable in the opposite direction to force the measured quantities of material from the chamber and through the element, a carriage reciprocable in a given straight path toward and away from the article, a support for the unit mounted on the carriage for reciprocable movement in the given straight path with the carriage and for reciprocable movement in a transverse straight path, means operable in timed relation with each other to reciprocate the carriage and the support whereby the feeding element will be moved through their combined straight path movements in a rectilinear path relative to the article to move the quantities of material toward the article and to force the quantities of material onto the article, means operable during movement of the carriage to actuate the valve, and a cam positioned in the path of the plunger during movement of the support on the carriage to cause the plunger to eject the material.

4. An apparatus operable through repeated cycles to eject given quantities of thermistor material intermittently and feed them to spaced positions on longitudinally advanced spaced parallel wires, the apparatus comprising a hollow feeding element, a receptacle for the material, a support for the element, means to force quantities of the material from the receptacle through the feeding element and eject them from the element, and means operable to move the support with the feeding element in straight lines to form a rectilinear path relative to the wires to cause the element to lay the quantities of material across spaced portions of the wires.

CARL HERZOG.

REFERENCES CITED

The following references are of record in the file of this patent:

UNITED STATES PATENTS

| Number | Name | Date |
| --- | --- | --- |
| 2,029,922 | Heckel et al. | Feb. 4, 1936 |
| 2,081,758 | Milmoe | May 25, 1937 |
| 2,123,354 | Corse | July 12, 1938 |
| 2,218,071 | Pohle | Oct. 15, 1940 |
| 2,296,861 | Matter | Sept. 29, 1942 |

FOREIGN PATENTS

| Number | Country | Date |
| --- | --- | --- |
| 461,386 | Great Britain | Feb. 16, 1937 |